United States Patent Office 3,302,061
Patented Jan. 31, 1967

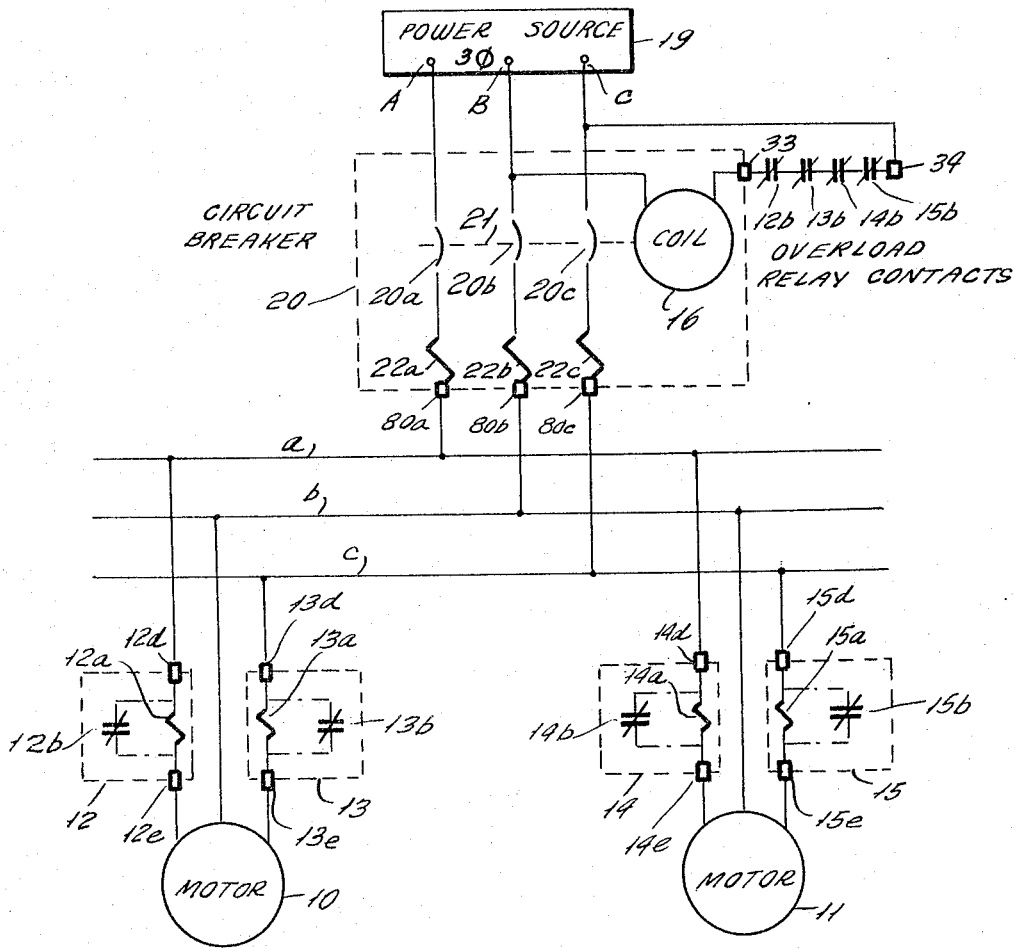

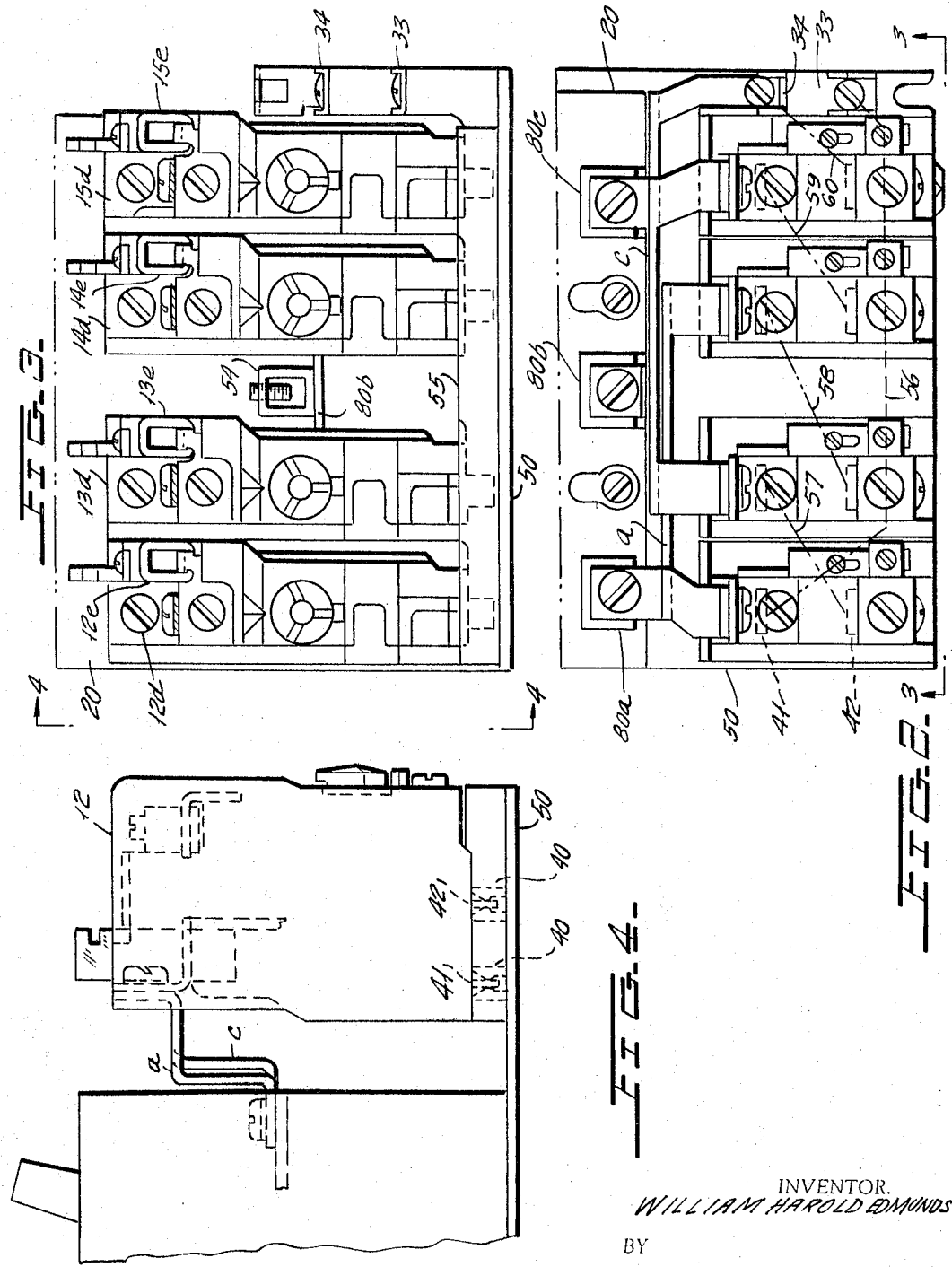

3,302,061
CIRCUIT BREAKER WITH UNDERVOLTAGE RELAY IN SERIES WITH MOTOR CONTROL OVERLOAD RELAY AND PLUG-IN BASE
William Harold Edmunds, Bloomfield Hills, Mich., assignor to I-T-E Circuit Breaker Company, Philadelphia, Pa., a corporation of Pennsylvania
Filed Aug. 31, 1964, Ser. No. 393,149
4 Claims. (Cl. 317—13)

The instant invention relates to circuit protection means in general and more particularly relates to a novel combination including a circuit breaker and overload relays for motor protection.

Copending application Serial No. 225,044, filed September 20, 1962, now issued as Patent No. 3,226,510, entitled Overload Relay for Motor Starter, with R. W. Thomas et al. as inventors and assigned to the assignee of the instant invention, describes in detail an overload relay used in combination with a contactor to form a motor starter. Copending application Serial No. 185,328, filed April 5, 1962, now issued as Patent No. 3,175,064, entitled, Shunt Trip and Undervoltage Device, with F. E. Myers as inventor and assigned to the assignee of the instant invention, sets forth a construction for an automatic circuit breaker having undervoltage and shunt tripping means.

The instant invention consists of overload relays and a circuit breaker, with an undervoltage tripping means, connecting a plurality of motors to a power source in a manner such that the motors are energized and deenergized simultaneously. Such operation is required for many industrial applications. For example, should the motor for the pump circulating a coolant or lubricant for a machine tool cease to function, it is essential that the main motor driving the machine tool be stopped. Another application for the instant invention is for the main control to an electrified traveling crane. Such a device usually includes five motors. A failure of any one of the five should cause all five to be deenergized.

As will be hereinafter explained in detail, the combination of a circuit breaker and a plurality of overload relays are mounted to a common mounting means. The common mounting means includes a plug-in base, for the overload relays with the base having internal conductors for connecting the control circuits of the relays in series, and also positions the overload relays adjacent to the circuit breaker load terminals.

Accordingly, a primary object of this invention is to provide a novel protection circuit.

Another object is to provide a novel circuit for simultaneously deenergizing a plurality of electrical devices upon the occurrence of a fault at any of the devices.

Still another object is to provide a protection circuit having a novel combination of overload relays and a circuit breaker with an auxiliary tripping device.

A further object is to provide a protection circuit in which the coil of an undervoltage device is connected in series with the contacts of a plurality of overload relays with the relays being connected to detect fault conditions in electrical devices whereby the opening of any overload relay contacts is effective to deenergize the coil thereby causing opening of a main circuit breaker connecting the electrical devices to a power source.

A still further object is to provide a circuit breaker and overload relays mounted on a common base and electrically connected to form a protection circuit.

These as well as further objects of this invention shall become readily apparent after reading the following description of the accompanying drawings in which:

FIGURE 1 is an electrical schematic illustrating a protection circuit constructed in accordance with the teachings of the instant invention.

FIGURE 2 is a fragmentary plan view showing a circuit breaker and four relays mounted to a common base and electrically connected to one another in accordance with the electrical schematic of FIGURE 1.

FIGURE 3 is an end view of the elements shown in FIGURE 2 looking in the direction of arrows 3—3 of FIGURE 2.

FIGURE 4 is a fragmentary side elevation looking in the direction of arrows 4—4 of FIGURE 3.

Now referring to the figures and more particularly to the schematic of FIGURE 1, electric motors 10 and 11 are each three phase units connected to busses a, b, and c. Heaters 12a and 13a of overload relays 12 and 13 respectively, are connected in the lines between motor 10 and busses a, c, respectively. Similarly heaters 14a and 15a of overload relays 14 and 15, respectively, are connected in the lines between motor 11 and busses a, c, respectively. Overload relays 12–15 are of a construction disclosed in the aforesaid copending application, Serial No. 225,044. Contacts 12b, 13b, 14b and 15b of overload relays 12–15, respectively, are serially connected and are connected in series with detecting element or coil 16, of an undervoltage tripping device for automatic circuit interrupter 20. The series combination of contacts 12b–15b and coil 16 is connected between terminals B and C of three phase power source 19.

Circuit breaker 20 is a three phase unit of a type described in the aforesaid copending application Serial No. 185,328 and includes three sets of main contacts 20a, 20b and 20c which are operated simultaneously into and out of engagement by a common operating mechanism which, for schematic purposes, is illustrated by dotted line 21. Each phase of circuit breaker 20 is provided with an individual automatic tripping means responsive to overload conditions at the circuit breaker. Automatic tripping means 22a is interposed between bus a and main contacts 20a with the latter also being connected to terminal A of power source 19. Similarly, automatic tripping means 22b and 22c are connected between busses b and c respectively and main contacts 20b and 20c, respectively, with the latter also being connected to terminals B and C, respectively, of power source 19.

With all of the contacts closed as illustrated, should any of the overload relay contacts 12b15b– open, coil 16 of the undervoltage device will be deenergized. In a manner well known to the art, deenergization of coil 16 will cause an element of operating mechanism 21 to be displaced to a position for bringing about automatic opening of main contacts 20a, 20b and 20c thereby disconnecting motors 10 and 11 from power source 19. Further, even with all of the overload relay contacts closed should an undervoltages condition develop at power source 19, when the energization of coil 16 falls below a predetermined level the automatic tripping operation of circuit breaker 20 will take place thereby preventing damage to motors 10 and 11 or the apparatus operated thereby.

Now referring more particularly to FIGURES 2 through 4 which illustrate a physical embodiment of certain elements shown schematically in FIGURE 1, circuit breaker 20 is secured to common mounting plate 50 having plug-in base 55 mounted thereto at the load end of circuit breaker 20. Plug-in base 55 is of a construction illustrated in detail in copending application Serial No. 263,-642, filed March 7, 1963, now Patent No. 3,213,407, entitled Plug-In Base, with Thomas et al. as inventors, and assigned to the assignee of the instant invention.

Briefly, the main portion plug-in base 55 is constructed of insulating material having suitable internal recesses to position and insulate internal jumpers 56 through 60. Both ends of jumpers 57 through 59, as well as one end of each of the jumpers 56-60, are provided with female type plug-in terminals 40 which engage male type terminals 41, 42 extending from the bottom of each overload relay and connected in the control circuits thereof. Plug-in base 55 is constructed to mount all four overload relays 12-15 in side by side relationship with power terminals 12d, 13d, 14d, and 15d confronting the load end of circuit breaker 20.

Jumpers a and c in FIGURES 2 through 4 constitute busses a and c, respectively, of FIGURE 1. Jumper a is provided with extensions which are connected to overload relay terminals 12d, 14d and circuit breaker load terminal 80a while jumper c is provided with extensions which are connected to relay terminals 13d, 15d, circuit breaker load terminal 80c and terminal 34 of base 55, the latter being connected to internal plug-in base jumper 60. Although not illustrated, appropriate portions of jumpers a and c are coated with insulating material in the areas where clearance between members at different electrical potentials requires more than air as a dielectric.

Plug-in base terminal 33 at the end of internal plug-in jumper 56 is adapted to be connected to one end of the tripping device coil 16. Wire grip 54 mounted to the middle load terminal of circuit breaker 20 constitutes the bus c of FIGURE 1.

Thus, this invention provides a novel protection circuit including overload relays whose contacts are arranged in series with the coil of the undervoltage device for automatically tripping a circuit breaker which connects the motors to a single energizing source. Although this invention has been illustrated by describing a specific embodiment having a circuit breaker with an undervoltage device, it should be appreciated by those skilled in the art that different auxiliary tripping devices may be substituted for the undervoltage device. More particularly the overload relay contacts may normally be open and connected in parallel with one another with the parallel combination being in series with the operating coil of a shunt tripping device. With such an arrangement, the closing of any of the overload relay contacts will cause the shunt trip to bring about opening of the circuit breaker. The electrical arrangement provided by the instant invention may readily be carried out by a physical embodiment in which a circuit breaker and a plurality of overload relays are mounted to a common member having a plug-in base to receive the control elements of the overload relays.

It is noted that for some applications it may be advantageous to protect a single motor by utilizing the arrangement hereinbefore described. Such circumstances are those in which it may be less expensive to utilize a circuit breaker in combination with a pair of overload relays rather than employ overload relays, a contactor and a starting interlock for energizing the contactor. Under such circumstances it is assumed that the thermal and/or magnetic characteristics of the circuit breaker automatic trip unit are not, by themselves, suitable for motor starter applications.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In combination:

a multiphase power source;

a circuit interrupter including main contacts in electrical series with said power source and mechanical operating means for operating said main contacts between open and closed positions, said interrupter further including an auxiliary tripping device which when activated operates said mechanical operating means causing the latter to operate said main contacts from said closed to said open position; said circuit interrupter having only as many sets of main contacts as there are phases of said multiphase power source;

first and second electrically energizable devices, each in electrical series with said main contacts of said circuit interrupter;

first and second overload units each including a fault detecting portion connected in circuit between said main contacts and one of said electrically energizable devices, respectively, and each of said first and second overload units further including a set of contacts and means for automatically operating said set of contacts when said fault detecting portion associated therewith is overloaded;

circuit means connecting an element of said auxiliary tripping device in circuit with said sets of contacts of said first and second overload units, respectively; whereby operation of either set of contacts of said first and second overload units in response to the detecting of a fault by the respective fault detecting portion thereof will activate said auxiliary tripping device to open said main contacts of said circuit interrupter and thereby deenergize both said first and second devices which are both in series therewith, and whereby regardless of the number of said devices which are connected to said interrupter, all of said number will be deenergized upon the opening of the main contacts of said interrupter.

2. The combination of claim 1, wherein each of said fault detecting portions of said overload units includes thermally responsive means.

3. The combination of claim 1, wherein said auxiliary tripping device is an undervoltage detecting means, and said element thereof is a current carrying coil, said sets of contacts of said overload units being connected in electrical series with said coil.

4. The combination of claim 1, and further including a mounting member and a plug-in base secured to said mounting member; said circuit interrupter secured to said mounting member with said plug-in base positioned at an end of said circuit interrupter and having recessed terminals for the reception of cooperating terminals of said overload units; said plug-in base further including internal jumpers electrically connecting said sets of contacts of said overload units in proper relationship, said circuit interrupter including external terminal portions extending toward said overload units for facilitating electrical connection of said main contacts to said fault detecting portions of said overload units.

References Cited by the Examiner

UNITED STATES PATENTS

| | | | |
|---|---|---|---|
| 1,134,752 | 4/1915 | Leonard | 317—46 X |
| 2,930,938 | 3/1960 | Tapper | 317—46 |
| 2,967,977 | 1/1961 | McNicol et al. | 317—46 X |
| 2,987,651 | 6/1961 | Evans et al. | 317—13 |
| 3,141,996 | 7/1964 | McGrath | 317—46 X |

MILTON O. HIRSHFIELD, *Primary Examiner.*

SAMUEL BERNSTEIN, *Examiner.*

R. V. LUPO, *Assistant Examiner.*